UNITED STATES PATENT OFFICE.

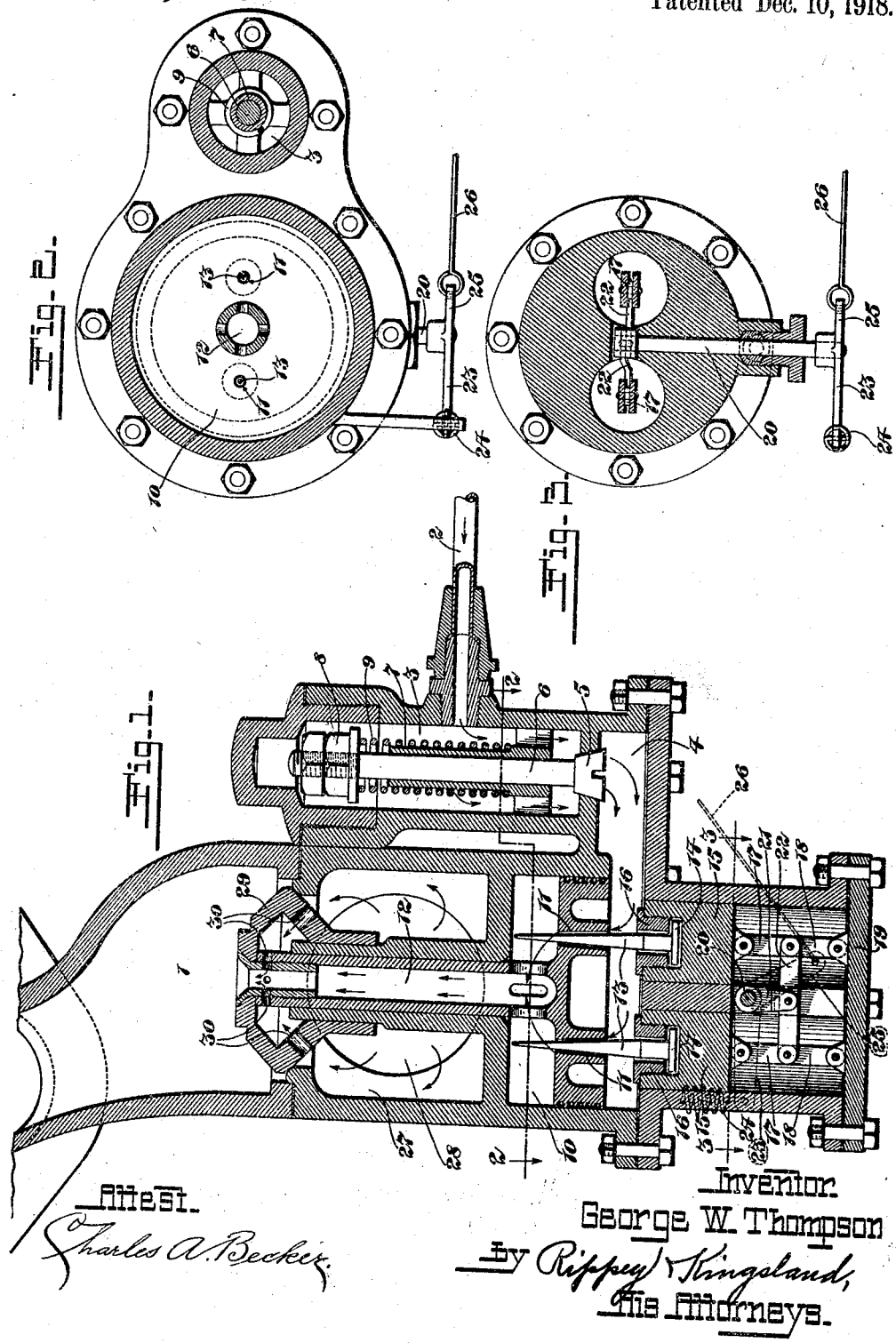

GEORGE W. THOMPSON, OF SPRINGFIELD, MISSOURI, ASSIGNOR OF THIRTY-TWO ONE-HUNDRED-AND-TWENTY-EIGHTHS TO WILLIAM B. SANFORD, TWENTY-FOUR ONE-HUNDRED-AND-TWENTY-EIGHTHS TO DOUGLAS J. LANDERS, TWENTY-ONE ONE-HUNDRED-AND-TWENTY-EIGHTHS TO WILLIAM A. McATEE, TWELVE ONE-HUNDRED-AND-TWENTY-EIGHTHS TO ALPHONSO B. LOVAN, TWELVE ONE-HUNDRED-AND-TWENTY-EIGHTHS TO GEORGE W. YOUNG, AND THREE ONE-HUNDRED-AND-TWENTY-EIGHTHS TO WILLIAM T. SHORES, ALL OF SPRINGFIELD, MISSOURI, AND SIX ONE-HUNDRED-AND-TWENTY-EIGHTHS TO CLARENCE H. NICHOLS, OF NEW YORK, N. Y.

GAS-MIXER.

1,287,139.   Specification of Letters Patent.   Patented Dec. 10, 1918.

Application filed December 8, 1917.   Serial No. 206,168.

*To all whom it may concern:*

Be it known that I, GEORGE W. THOMPSON, a citizen of the United States, residing at Springfield, Greene county, Missouri, have invented a new and useful Gas-Mixer of which the following is a specification.

This invention relates to gas mixers.

The invention relates specifically to an improved gas mixer for use in connection with internal combustion engines using gas of high explosive potential such, for instance, as acetylene gas.

An object of the invention is to provide an improved gas mixer with improved means for controlling the passage of the acetylene gas into the air mixing chamber and preventing back-fire into the passage from which the gas is taken.

Another object of the invention is to provide a gas mixer of the character mentioned with improved means for operating the valves controlling the passage of the gas toward the air mixing chamber.

Other objects relate to the construction and arrangement of the parts and will fully appear from the following description, in which reference is made to the accompanying drawing illustrating one form of the invention, in which—

Figure 1 is a sectional view of the carbureter.

Fig. 2 is a sectional view on the line 2—2 of Fig. 1.

Fig. 3 is a sectional view on the line 3—3 of Fig. 1.

The gas mixer illustrated includes a mixing chamber 1 into which the gas and the air are admitted and from which the mixture is drawn into the manifold and the cylinders of the engine; a supply pipe 2 for conducting the gas from any source of supply to the mixer; and the devices and appliances between the supply pipe and the mixing chamber for controlling the passage of the gas into the mixing chamber.

From the supply pipe 2 the gas is admitted into a receiving chamber 3. From the receiving chamber 3 the gas passes into a chamber 4 through a valve controlled passage. The valve controlling passage between the chambers 3 and 4 comprises a head 5 arranged to seat within the passage to close the same and movable downwardly into the chamber 4 under the pressure of the gas in order to open the passage and permit the gas to pass from the chamber 3 into the chamber 4. The valve is provided with a stem 6 operating within a sleeve bearing 7 and having one or more nuts 8 in threaded engagement with the upper end thereof. The valve is yieldingly retained in closed adjustment by a spring 9 incircling the sleeve bearing 7 and having its lower ends abutting against the support of the sleeve bearing and its upper end against the nut 8. The spring being of the expansion type, the valve is thereby retained in closed adjustment except when the engine is in operation. When the engine is started the air is drawn out of the chamber 4, thus enabling the gas to open the valve 5 in opposition to the spring 9 and pass into the chamber 4, whence the gas is drawn into the air mixing chamber and into the engine. It will be understood that the valve 6 operates rapidly to open and to closed positions and that whenever the chamber 4 is filled with air or gas the spring 9 will close the valve 5 and prevent the passage of any additional quantity of gas into the chamber 4, until the pressure against the lower end of the valve 5 is relieved, which occurs during the intake movement of each piston of the engine.

From the chamber 4 the gas enters a chamber 10 through passages 11 and from the chamber 10 the gas passes into the mixing chamber 1 through a passage 12 constituting a communication between the chamber 10 and the mixing chamber.

The passages 11 are preferably tapered and in each passage a tapered valve 13 is supported. As shown, there are two passages 11 each equipped with a valve 13. By using the two valves and the two passages controlled thereby less movement of the valves is required to open and close the passages than would be required in order to regulate a single passage by a single valve and, in addition, the adjustment may be more accurately maintained. The valves 13 have heads 14 on their lower ends seating in recesses in supports 15 movably mounted in chambers formed in the bottom wall of the chamber 4. The valves 13 are removably retained in connection with the movable supports 15 by plugs 16. Each of the supports 15 is pivotally connected to a link 17, the lower ends of which are pivoted to links 18, the latter having their lower ends pivoted to a supporting member 19. A rockable rod 20 is supported transversely between the links 17, and has a depending arm 21 which is pivoted to a link 22 connecting the links 17 and 18, as illustrated in Fig. 1. Thus, when the rod 20 is rocked in one direction, the toggle formed by the links 17 and 18 will be shortened in length thus moving downwardly the supports 15 and the valves 13 and, due to the tapered construction of the valves 13, the passages 11 will be enlarged permitting a greater volume of gas to pass from the chamber 4 into the chamber 10 than can pass when the valves 13 are in their raised positions in which the passages 11 are nearly closed. The supports 15 are normally retained in position to support the valves 13 in their raised positions in which the passages 11 are nearly closed. In order to hold the supports 15 in their raised position means is provided for retaining the rod 20 in position to hold the toggle links 17 and 18 extended. For this purpose an arm 23 is attached to the rod 20 and a spring 24 in connection with said arm is effective to hold the same yieldingly in the position required to retain the supports 15 elevated.

When it is desired to permit a greater volume of gas to pass the valves 13, the rod 20 is turned in opposition to the spring 24 in order to lower the valves 13. For turning the rod 20 in the manner stated an arm 25 is secured to the rod 20 and provided with a connection 26 so that by moving said connection in one direction the rod will be turned in opposition to the spring 24. When the connection 26 is released the spring 24 will restore the rod 20 to its former position, thereby raising the valves 13. Thus the volume of gas passing the valves 13 may be varied as desired.

Since it is necessary to permit air to enter the mixer and mix with the gas, I have provided an air inlet chamber 27 below the chamber 1, and provided with an opening 28 for admitting air thereto. The chamber 27 is separated from the chamber 1 by a partition 29 in connection with the passage 12, and the air from the chamber 27 enters the passage 12 through openings 30, so that the air and gas become partially mixed in the passage 12 before entering the chamber 1.

As shown the partition 29 extends obliquely downwardly and outwardly from the upper end of the passage 12 into contact with an inwardly extended flange above the chamber 27, thus closing communication between the chamber 27 and the chamber 1 except through the openings 30 and the passage 12.

A gas mixer embodying the construction described is specially adapted for use in connection with engines using acetylene gas, though it will be understood that the invention may be applied to engines using any of the gases more usually employed. The provision of the valve 5 in connection with the other improved features of the carbureter prevents back-fire into the gas supply passage 2, so that the use of acetylene gas, or other similar highly explosive gases, is rendered safe and reliable. It will be understood that the construction and arrangement of the parts may be varied within equivalent limits without departing from the principles of the invention.

I do not confine myself to unessential details, but what I claim and desire to secure by Letters Patent, is:—

1. A gas mixer, comprising a gas receiving chamber, a gas supply pipe opening into said receiving chamber, a separate chamber, a passage from the receiving chamber into the separate chamber, a valve movable to positions to open and to close said passage and arranged to be moved to open position by the pressure of the gas in the receiving chamber, a spring normally holding said valve in closed position and arranged to yield under the pressure of the gas to permit the valve to be moved to open position, a mixing chamber, a passage for conducting the gas from the separate chamber to the mixing chamber, valves controlling said last-named passage, an actuator normally holding said controlling valves in positions in which said last-named passage is nearly closed, manipulative means for moving said controlling valves to open positions in opposition to said actuator, and passages for admitting air into the mixing chamber.

2. A gas mixer, comprising a mixing chamber, a gas receiving chamber, an intermediate chamber between the receiving chamber and the mixing chamber, a valve controlling the passage of gas from the receiving chamber to the intermediate chamber and arranged to be moved to open position by the pressure of the gas in the receiving chamber, a passage for conducting the gas from the intermediate chamber to the mixing chamber, valves controlling the passage of the gas from the intermediate chamber into said last-named passage, supports for said valves, an actuator holding said supports in position in which said last-named valves are retained in nearly closed positions, and manipulative means for moving said supports in opposition to said actuator to move said valves to positions to open said passages to a greater extent.

3. A gas mixer, comprising a mixing chamber, a gas receiving chamber, an intermediate chamber between the receiving chamber and the mixing chamber, a valve controlling the passage of gas from the receiving chamber to the intermediate chamber and arranged to be moved to open position by the pressure of the gas in the receiving chamber, means normally holding said valve in closed position, valves controlling the passage of the gas from the intermediate chamber to the mixing chamber, movable supports for said valves, an actuator controlling said supports and normally holding said valves in positions in which said valves are nearly closed, and a device for moving said supports in opposition to said actuator to move said valves to open positions.

4. A gas mixer, comprising a mixing chamber, a gas receiving chamber, an intermediate chamber between the gas receiving chamber and the mixing chamber, a valve controlling the passage of gas from the receiving chamber to the intermediate chamber and arranged to be moved to open position by the pressure of the gas in the receiving chamber, a passage for conducting the gas from the intermediate chamber to the mixing chamber, valves for controlling said passage, devices normally supporting said valves in position to permit a predetermined volume of gas to pass from the intermediate chamber to the mixing chamber, and means for moving said devices from their normal positions to positions in which said valves will permit a greater volume of gas to pass from the intermediate chamber to the mixing chamber.

5. A gas mixer, comprising a mixing chamber, a gas receiving chamber, a chamber intermediate the gas receiving chamber and the mixing chamber, a normally closed valve controlling the passage of gas from the receiving chamber into the intermediate chamber and arranged to open under the pressure of the gas in the receiving chamber, constantly open valves controlling the passage of gas from the intermediate chamber into the mixing chamber, supports holding said valves normally in position to permit a predetermined quantity of gas to pass from the receiving chamber to the mixing chamber, an actuator for holding said supports in the positions mentioned, and manipulative means for moving said supports to positions in which said valves will permit a greater volume of gas to pass from the intermediate chamber into the mixing chamber.

GEORGE W. THOMPSON.

Copies of this patent may be obtained for five cents each, by addressing the "Commissioner of Patents, Washington, D. C."